United States Patent [19]

Purkayastha et al.

[11] Patent Number: 5,051,861
[45] Date of Patent: Sep. 24, 1991

[54] MULTIPLE CIRCUIT INTERRUPTER ADDRESS IDENTIFICATION SYSTEM

[75] Inventors: Indrajit Purkayastha, Weatogue, Conn.; Clinton K. Martin, West Burlington, Iowa

[73] Assignee: General Electric Company, New York, N.Y.

[21] Appl. No.: 462,386

[22] Filed: Jan. 9, 1990

[51] Int. Cl.$^5$ ............................................. H02H 3/04
[52] U.S. Cl. ................................... 361/96; 340/639; 364/483; 361/97
[58] Field of Search .................... 361/96, 97, 66, 156, 361/81; 364/483; 340/518, 525, 825.07, 825.13, 639

[56] References Cited

U.S. PATENT DOCUMENTS

| | | | |
|---|---|---|---|
| 4,374,405 | 2/1983 | Olashaw et al. | 361/355 |
| 4,649,455 | 3/1987 | Scott | 361/93 |
| 4,658,243 | 4/1987 | Kimura | 340/505 |
| 4,672,501 | 6/1987 | Bilac et al. | 361/96 |
| 4,710,844 | 12/1987 | Scott et al. | 361/96 |
| 4,728,914 | 3/1988 | Morris et al. | 335/6 |
| 4,827,369 | 5/1989 | Saletta | 361/96 |

Primary Examiner—A. D. Pellinen
Assistant Examiner—C. Schultz
Attorney, Agent, or Firm—Richard A. Menelly; Walter C. Bernkopf; Fred Jacob

[57] ABSTRACT

Low voltage electric switchgear equipment includes a central programmer unit electrically interconnected with electronic main and branch circuit interrupters within the same enclosure and used with a multi-phase power distribution circuit. Indicating diodes are arranged on each of the circuit interrupters for signaling the occurrence of an overcurrent condition. The same indicating diodes are arranged for responding to address commands generated by the field programmer as to the exact location of each circuit interrupter within the enclosure.

8 Claims, 4 Drawing Sheets

MULTIPLE CIRCUIT INTERRUPTER ADDRESS IDENTIFICATION SYSTEM

BACKGROUND OF THE INVENTION

The advent of "smart" circuit interrupters, such as that described within U.S. Pat. No. 4,672,501 which Patent is incorporated herein for reference purposes, permits several such circuit interrupters to be arranged within a common enclosure, all interconnected with a central processor unit. The central microprocessor within the central processor unit, in turn, communicates with each of the circuit interrupters within the common enclosure for enhanced protection of the associated electrical equipment. The central processor unit continuously interrogates each of the interconnected circuit interrupters to determine the status of the individual circuit interrupter setpoint parameters as well as whether the circuit interrupter has responded to interrupt circuit current to an associated piece of electrical equipment. An operator could then readily determine from the central processor unit which of the interconnected circuit interrupters has responded and could also determine the nature and magnitude of the overcurrent condition causing the circuit interrupter to respond.

In certain industrial environments, it is customary to assemble a main circuit interrupter along with several branch circuit interrupters within a common enclosure such as within low voltage switchgear applications. A central processor, hereafter "field programming unit" is arranged within the enclosure and is electrically interconnected with the main and branch circuit interrupters to determine the condition and status of the circuit interrupter and protected electrical equipment. In order to address a particular branch circuit interrupter, each branch circuit interrupter is assigned a name which is stored within the field programming unit. When the branch circuit interrupter is summarily addressed by a name, the field programming unit displays the status and condition of the addressed circuit interrupter to ascertain the corresponding status. Oftentimes, the circuit interrupters are interchanged within the enclosure such that the operator is no longer able to determine the status and condition of associated electrical equipment by addressing a named circuit interrupter.

One purpose of this invention is to provide a system whereby the particular circuit interrupter addressed by the field programming unit provides positive indication that the particular circuit interrupter at a given address is in fact the correct circuit interrupter responding to the status and condition request of the field programmer unit.

SUMMARY OF THE INVENTION

Low voltage electrical switchgear equipment enclosing a field programming unit along with a main circuit interrupter and a corresponding plurality of branch circuit interrupters provides positive indication that a particular circuit interrupter is addressed by the field programming unit. The light emitting diode associated with each main and branch circuit interrupter provides visible indication to an operator that a particular circuit interrupter is correctly addressed.

DESCRIPTION OF THE PREFERRED EMBODIMENT

Figure 1:
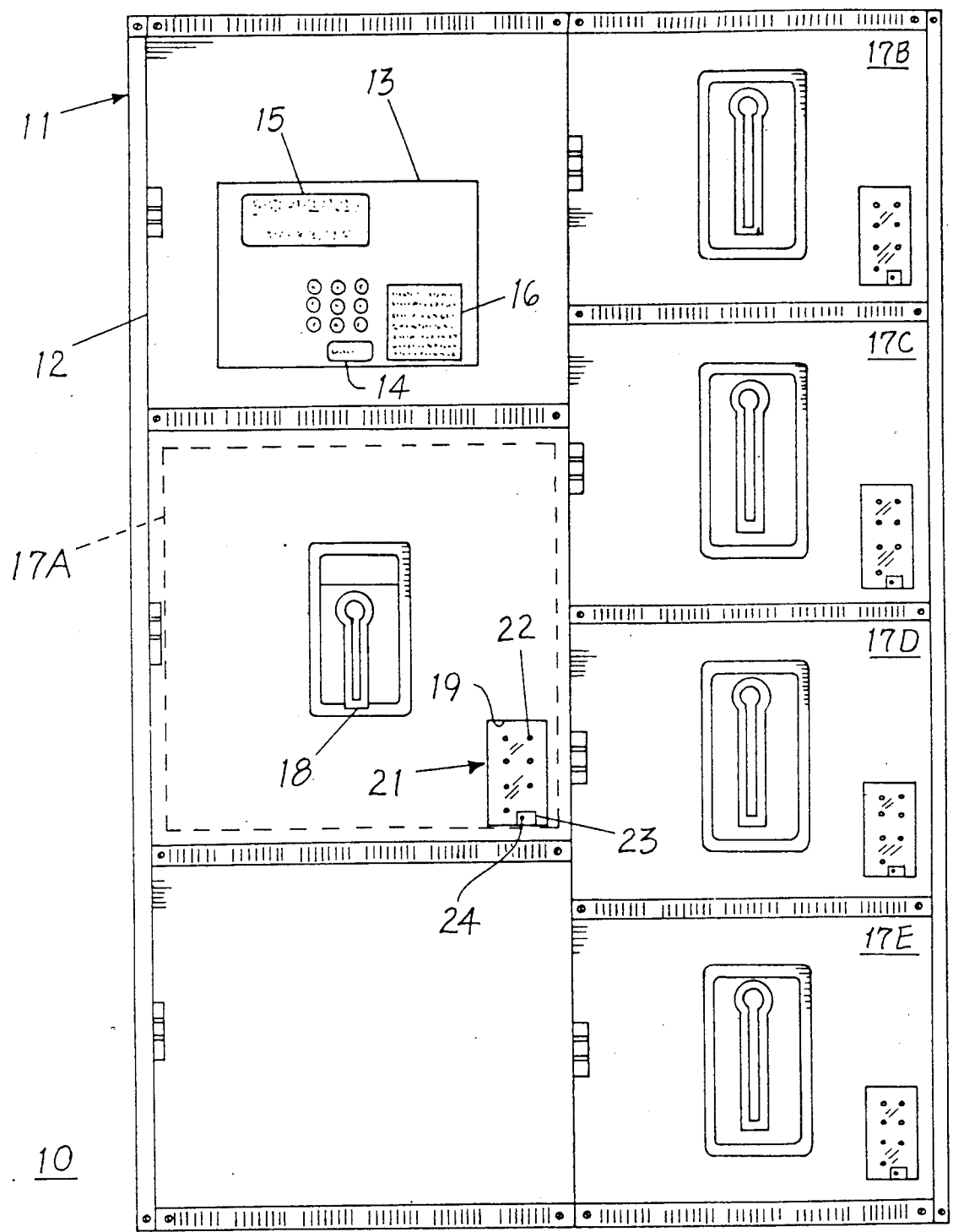
FIG. 1 is a front view of a low voltage switch-gear enclosure containing a field programming unit, a main circuit interrupter and four interconnected branch circuit interrupters.

A low voltage switchgear assembly 10 is shown in FIG. 1 and consists of a metal enclosure 11 that is subdivided into a plurality of compartments 12. A field programming unit 13 is arranged within one of the compartments such that the keypad 14 and display 15 are accessible from the exterior of the enclosure. Indicia 16 provides instruction for displaying the status and setpoint information stored within each of the circuit interrupters 17A-17E arranged within separate compartments. The circuit interrupters are similar to those described in U.S. Pat. No. 4,374,405 and include an operating handle 18 accessible from the exterior of the compartment to turn the circuit breaker contacts to their "ON" and "OFF" positions. The circuit interrupter programmer unit 21 is visible behind a transparent window 19 of glass or plastic such that the current and time adjustment switches 22 and rating plug 23 can be visually inspected. A good description of the rating plug design is found in U.S. Pat. No. 4,728,914 which Patent is incorporated herein for purposes of reference. A light emitting diode (LED) 24 on the rating plug indicates the presence of an overcurrent condition. The LED flashes "ON" and "OFF at a periodic rate of three times a second when the current flowing through the circuit breaker is of a magnitude close to the pickup threshold. If the magnitude of the current exceeds the pickup threshold, the LED remains on. If the current remains at this level, the circuit breaker will ultimately interrupt the current after a predetermined time has elapsed. In some instances, the window 19 is omitted, such that the LED status, the switch positions and rating plug value can only be ascertained when the compartment is fully opened.

Figure 2:
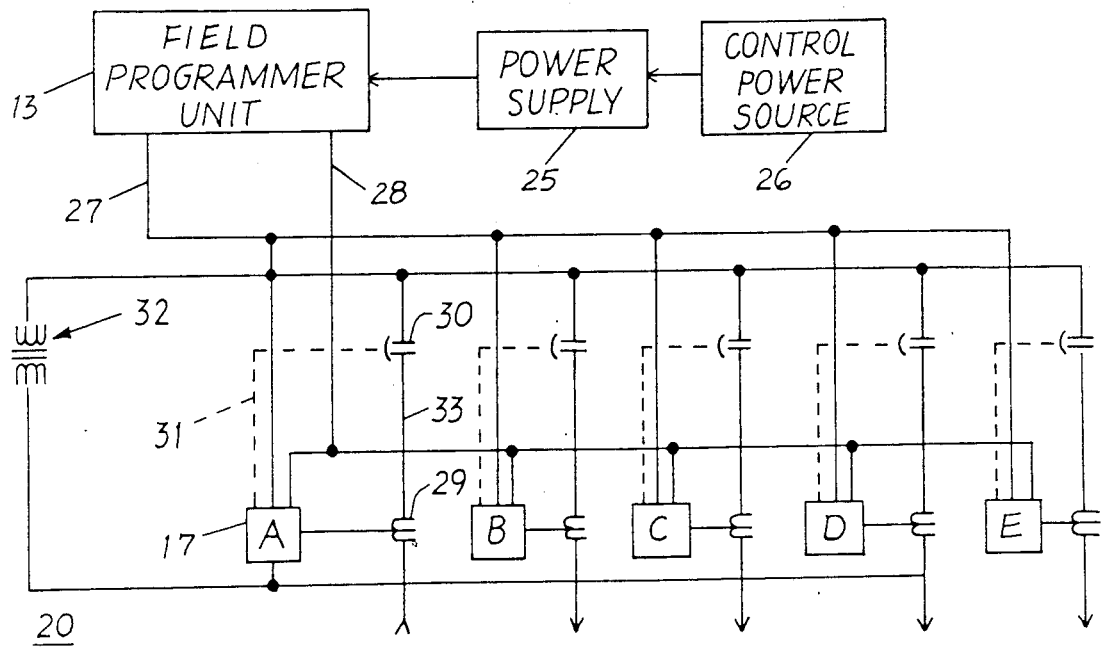
FIG. 2 is a diagrammatic representation of the interconnection between the field programming unit, main circuit interrupter and branch circuit interrupters within the enclosure of FIG. 1.

The interconnection between the field programming unit 13 and the circuit interrupters 17A-17E is best seen by referring now to the switchgear connection circuit 20 shown in FIG. 2. The field programming unit 13 is energized by means of a power supply unit 25 which, in turn, is connected with an external control power source 26. The field programming unit connects with the individual circuit interrupters 17A-17E by means of a communication bus 27 as well as by a separate control power bus 28, as indicated. The communication bus is similar to that described within aforementioned U.S. Pat. No. 4,672,501 and is capable of transmitting and receiving status information from each of the circuit interrupter units. In the switchgear circuit 20 depicted in FIG. 2, circuit interrupter 17A is arranged as a main circuit interrupter and the remaining circuit interrupters 17B-17E are arranged as branch circuit interrupters with the three-phase power distribution circuit, one phase of which is depicted by means of conductor 33. Corresponding pairs of separable contacts 30 are controlled by the respective circuit interrupters whereby a trip signal is outputted by the circuit interrupters over a trip line 31. The circuit current is sensed within each of the separate phases by means of corresponding current transformers 29 and the voltage within the circuit is detected by means of a potential transformer, as indicated generally at 32.

Figure 3:
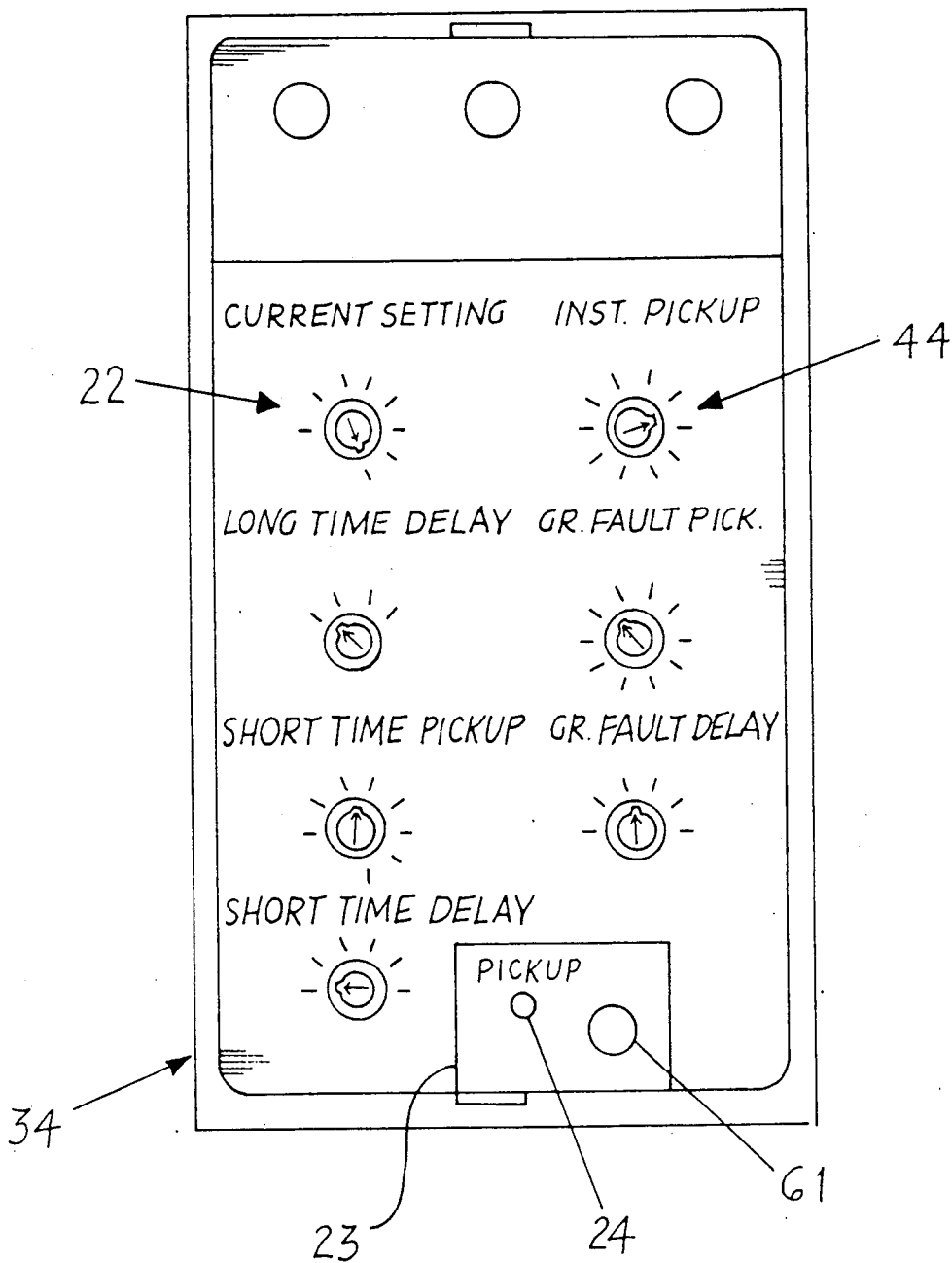
FIG. 3 is an enlarged front view of a circuit interrupter face panel used with the circuit interrupters of FIG. 1.

Each of the circuit interrupters includes a programming unit 21 shown in FIG. 3 which is similar to that described within U.S. Pat. No. 4,710,844, which patent is incorporated herein for reference purposes. The programmer comprises an enclosure 34 which includes the current and time setting switches 22 along with the instantaneous trip setting switch 44. The rating plug 23 sets the current ratings of the circuit interrupter as described within U.S. Pat. No. 4,649,455, which patent is incorporated herein for reference purposes. The indicating light in the form of an LED 24 is visible on the exterior surface of the rating plug. When the LED is flashing rapidly, it indicates the presence of a near-pickup condition. When the LED remains on, it signifies the presence of an overcurrent condition. If this condition persists, the circuit breaker will ultimately interrupt the current by opening the circuit breaker contacts. A test jack 61 provides electrical access to the circuit breaker trip unit circuit for test and calibration purposes.

Figure 4:
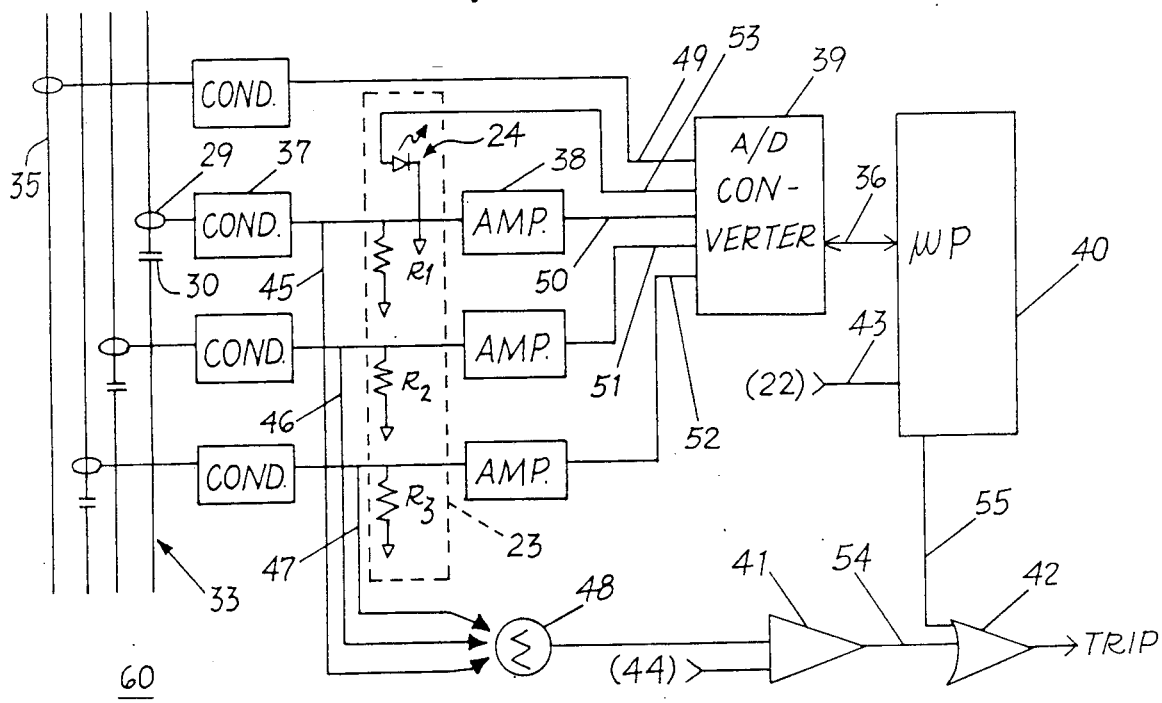
FIG. 4 is a schematic representation of the electrical connection between the circuit interrupter of FIG. 2 and the protected circuit.

The circuit interrupter trip circuit 60 is shown in FIG. 4 to include a corresponding plurality of signal conditioning circuits 37 such as described in the aforementioned U.S. Pat. No. 4,672,501, wherein the current signal is received over the three phase power conductors 33 through current transformers 29 and is rectified to provide a DC representation which is integrated by connection over conductors 45-47 to a summation circuit 48. A voltage representation of the circuit current is generated by means of burden resistors $R_1$-$R_3$ within each of the three phases, which resistors are physically located within the rating plug described earlier. The voltage value is transmitted through a corresponding plurality of amplifiers 38 and conductors 50-52 to an A-D converter 39 and to a microprocessor 40 over an I/O bus 36. An overcurrent condition is determined within the microprocessor and an indication thereof is transmitted over the I/O bus 36, A/D converter 39, LED 24 and conductor 53. When the magnitude of the overcurrent condition is below the threshold level, the LED is driven to flash at a rate of 3 times a second. When the magnitude increases above the threshold, the LED is driven on continuously. The trip signal separates the pairs of contacts 30 (FIG. 2) in each of the three phases to interrupt the circuit current. In a similar manner, the neutral conductor 35 connects over conductor 49 with the microprocessor through a similar signal conditioning circuit 37 and A/D converter 39 to determine the occasion of a ground fault condition within any of the associated phases. The output of the current and time switches 22 (FIG. 3) is inputted to the microprocessor over the input line 43 for both the overcurrent ampere settings as well as the long and short time settings. The output of the summation circuit 48 is connected to one input of a comparator 41 and the output of the instantaneous current switch 44 (FIG. 3) is transmitted to the other input to the comparator. The output of the comparator is connected to one input of an OR Gate 42 over conductor 54 and the output of the microprocessor is transmitted to the other input of the OR Gate over conductor 55.

Besides signaling the occurrence of an overcurrent condition through the circuit interrupters, the LED 24 also provides indication as to which one of the circuit interrupters is being addressed by the field programming unit. When the circuit interrupter 17A, in FIG. 1, is addressed and interrogated with respect to metering and setpoint values, it is important that the circuit interrupter designated "17A" responds accordingly. Oftentimes, a circuit interrupter within one compartment initially is interchanged with one in another compartment. An operator could then address the first circuit interrupter in the mistaken belief that it is still in the same compartment.

Figure 5:
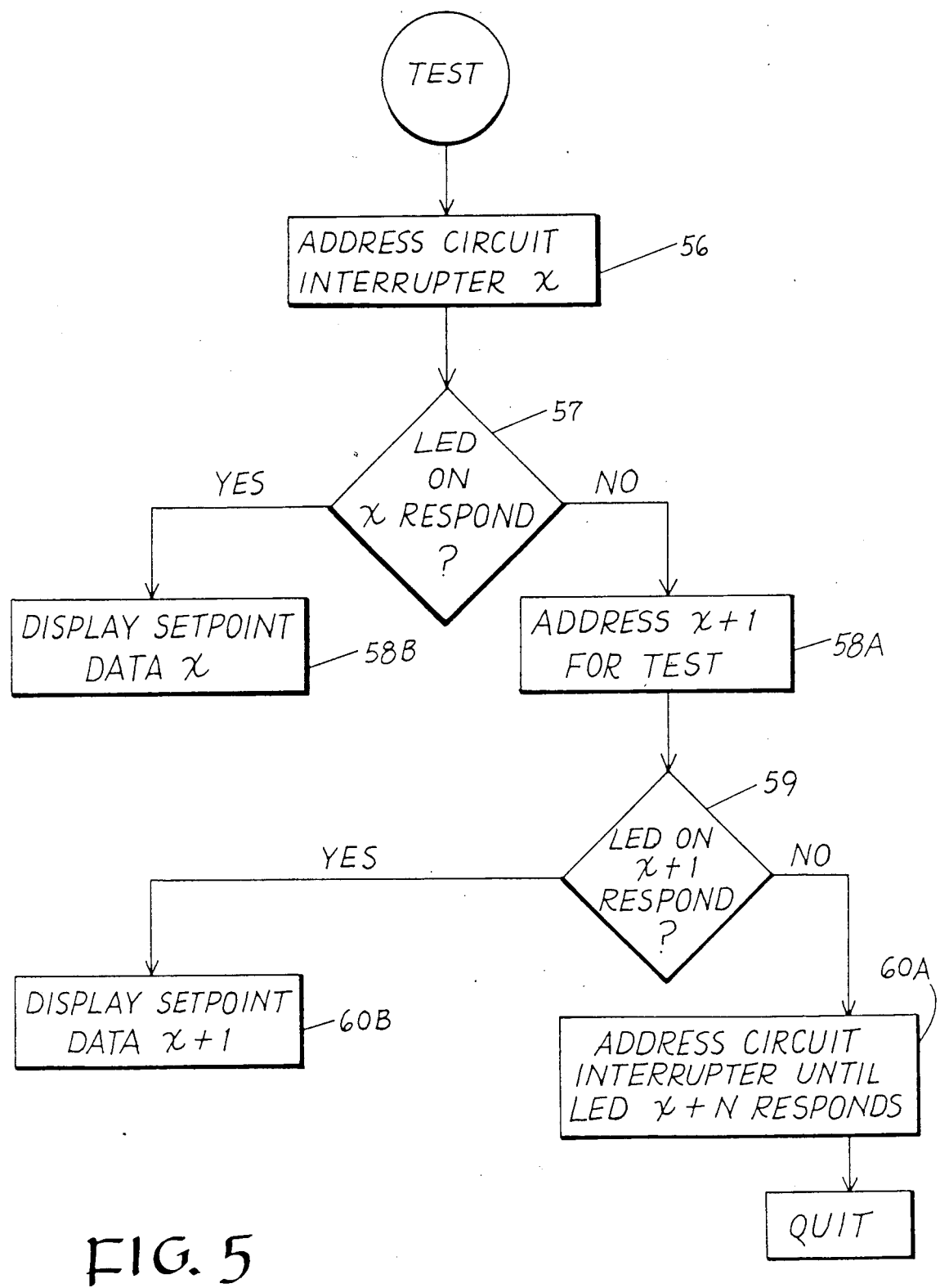
FIG. 5 is a flow chart representation of the address algorithm used within the field programming unit of FIGS. 1 and 2.

It can be seen, by comparing FIGS. 1 and 5, that the exact location of any circuit interrupter can be verified in the following manner. When the field programming unit 13 displays the status functions for any one of the circuit interrupters 17A-17E, the associated LED 24 immediately flashes once every two seconds to signal that the particular circuit interrupter is being addressed. The flow chart diagram shown in FIG. 5 indicates the program employed by the central microprocessor within the field programming unit to ensure that the correct circuit interrupter is addressed at all times. The particular circuit interrupter is addressed (56) and a determination is made as to whether the associated light emitting diode begins to flash (57). If the LED on the addressed circuit begins to flash (58B) the setpoint data is then displayed. If the LED on the addressed circuit interrupter does not flash (58A), then the next circuit interrupter is addressed (59) and if the associated LED begins to flash (60B), the setpoint data is displayed. If not, each successive circuit interrupter is addressed (60A), until the appropriate LED responds. Alternatively, the program within the central microprocessor could cause the associated LED on any addressed circuit interrupter to flash immediately upon request to allow the operator to determine the immediate location of the addressed circuit interrupter.

A low voltage switchgear assembly has herein been described wherein the appropriate circuit interrupter unit within the switchgear assembly responds to a status request by the field programmer unit in the nature of a predetermined number of flash cycles occurring at the associated LED display.

Having thus described our invention, what we claim as new and desire to secure by Letters Patent is:

1. Electric distribution equipment comprising in combination:
   a field programming unit including data entry means, a display and a central microprocessor;
   a plurality of circuit interrupters connected with said programming unit, each said circuit interrupter including circuit current sensing means, and separable contacts, each said circuit interrupter further including overcurrent and time delay data for interrupting circuit current through a multi-phase power distribution circuit; and
   indicating means associated with each said circuit interrupter to indicate the occurrence of an overcurrent condition through said distribution circuit and to indicate which of said circuit interrupters is addressed by said central microprocessor, said indicating means flashing ON and OFF at a first frequency upon occurrence of an overcurrent condition, said indicating means flashing ON and OFF at a second frequency when said circuit interrupter is addressed by said central microprocessor and said indicating means remaining ON when said distribution circuit is interrupted.

2. The equipment of claim 1 including a rating plug on each said circuit interrupter for setting the current rating of each said circuit interrupter, said rating plug including at least one resistor.

3. The equipment of claim 2 wherein said indicating means comprises a light source.

4. The equipment of claim 3 wherein said light source comprises a light emitting diode.

5. The equipment of claim 1 wherein said field programming unit and said circuit interrupters are enclosed within a common enclosure.

6. The equipment of claim 5 wherein each of said circuit interrupters are contained within a separate compartment within said enclosure.

7. The equipment of claim 1 wherein said second frequency is less than said first frequency.

8. A method of addressing in a multi-phase power distribution circuit a plurality of circuit interrupters within a common enclosure along with a field programming unit comprising the steps of:

providing each of said circuit interrupters with an indicating means;

interconnecting said field programming unit and said circuit interrupters with a bus;

sending an address signal to one of said circuit interrupters over said interconnecting data bus; causing said indicating means on said one circuit interrupter to flash ON and OFF at a first frequency upon occurrence of an overcurrent condition, causing said indicating means on said one circuit interrupter to flash ON and OFF at a second frequency when said one circuit interrupter is addressed by said field programming unit and causing said indicating means on said one circuit interrupter to remain ON when said distribution circuit is interrupted; and causing said indicating means on said one circuit interrupter to flash ON and OFF at a predetermined frequency to acknowledge receipt of said address signal.

* * * * *